Inventor
MENACHEM LEWIN
By Kirschstein, Kirschstein & Ottopp
Attorneys

United States Patent Office 3,484,340
Patented Dec. 16, 1969

3,484,340
FIRE-PROOFING OF CELLULOSIC MATERIAL WITH A BONDING AGENT CONTAINING BROMIDES
Menachem Lewin, Jerusalem, Israel, assignor to State of Israel, Ministry of Trade and Industry
Filed May 6, 1966, Ser. No. 548,303
Claims priority, application Israel, June 4, 1965, 23,679
Int. Cl. D21h *3/66;* C09k *3/28*
U.S. Cl. 162—159                                           7 Claims

ABSTRACT OF THE DISCLOSURE

Production of bonded cellulosic and lignocellulosic articles using an aqueous bonding agent composition containing at least either two metal bromides or a metal bromide and metal oxybromide. One of the two bromides or bromide and oxybromide is capable of lowering the viscosity and/or surface tension of the aqueous bonding composition and the other is capable of raising the viscosity and/or surface tension and the mutual proportions are so adjusted that the viscosity and/or surface tension are adjusted to a desired value.

---

Figure 1:
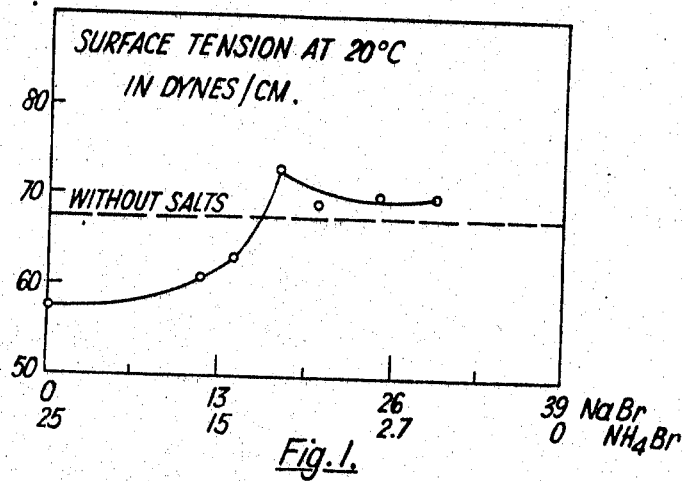

The present invention concerns the production of fire-resistant cellulosic and lignocellulosic articles coated with or incorporating a bonding agent. Such articles may, for example, be sized, bleached or unbleached paper or cardboard where the binding agent is the sizing material, laminated structures such as flat or corrugated laminated cardboard, veneers or plywood where the bonding agent is the adhesive used for gluing together the various plies of the structure, which structure in case of cardboard may also be sized, various hardboards and chipboards where the bonding agent is the binder, and the like. Hereinafter all the cellulosic and lignocellulosic articles which are coated with or incorporate a bonding agent will be referred to for short as "bonded cellulosic articles."

The bonding agents which are used in the manufacture of the bonded cellulosic articles with which the present invention is concerned are all those conventionally used in the art in the form of aqueous solutions or suspensions and include among others starch in its various forms, phenol-formaldehyde resins, urea and melamine formaldehyde resins, mixtures, of two or more of the above resins, mixtures of one or more of the above resins with starch, sodium silicate itself as well as in admixture with other adhesives, various proteinaceous adhesives, if desired, in combination with other adhesives, and many others. Hereinafter the term "bonding agent" will be used in an unspecific manner it being understood that it refers to any of the various bonding agents which are applicable in the manufacture of bonded cellulosic articles.

It is known to flameproof wood and other lignocellulosic structures by impregnation with various organic salts such as phosphates, borates, mixtures of borates and boric acid, antimonates, arsenates, sulfates and others. However, none of these yields any satisfactory flameproofing effect if merely incorporated in a bonding agent.

Moreover, when any of the above salts is incorporated in an aqueous bonding agent composition in an amount sufficient to produce any appreciable fire-resistance, the bonding agent coagulates with the result that the bonding capacity of the composition is impaired.

In accordance with the invention it has now surprisingly been found that incorganic bromides and oxybromides are very efficient fire resisting agents and that in distinction from other salts they can be incorporated in aqueous bonding agent compositions in an amount sufficient to produce fire-resistance without causing any deterioration of the bonding composition by coagulation of the bonding agent.

Every aqueous bonding agent composition has in fluid state certain optimal values for the viscosity and surface tension and any appreciable deviation from these values by way of increase or decrease, affects unfavourably the quality of the bonding agent composition and consequently also the quality of the bonded cellulosic article bonded therewith. Hereinafter the viscosity and surface tension of a fluid aqueous bonding agent composition will be referred to for short as "fluid state characteristics."

In the course of the investigations conducted in accordance with the present invention it has further been found, that the fluid state characteristics of an aqueous bonding agent composition are affected by the incorporation therein of an inorganic bromide or oxybromide. It has, moreover, surprisingly been found that while some bromides and oxybromides have the capacity of raising one or more fluid state characteristics, others have the capacity of lowering them.

Based on these observations the invention provides, in the production of a bonded cellulosic article (as herein defined) employing an aqueous bonding agent composition, a method of imparting a degree of fire resistance of the finished article by incorporating in the fluid composition at least two substances selected from the group of inorganic bromides and inorganic oxybromides provided that at least one of the substances is a bromide, one of which substances is capable of lowering at least one of the fluid state characteristics of the bonding agent while the other is capable of raising the same characteristic, said substances being added in such a total quantity as to impart to the product a desired degree of fire resistance and in such a relative proportion that said fluid state characteristic assumes a selected and preferred value.

In some cases the selected and preferred value of the reference fluid state characteristic may, for example, be substantially the value it had before the addition of said substances. In other cases the bonding capacity of the bonding agent composition may be improved by selecting a value that differs from the one before the addition of said substances. In any case the imparting of fire resistance in accordance with the invention is accompanied by a control of the viscosity and/or surface tension of the aqueous bonding agent composition and thereby a control of the bonding capacity.

The substances incorporated in accordance with the invention in the bonding agent composition may, for example, be two different bromides or a bromide and an oxybromide. Obviously more than two such substances may be used.

The quantity of the above substances to be incorporated will vary in accordance with their nature, the nature of the cellulose or lignocellulose, the desired degree of fire resistance and other factors. As a rule, the amount of oxybromides and/or bromides to be incorporated in the bonding agent will vary between 0.4 and 12% by weight of the cellulose or lignocellulose.

Examples of bromide salts that can be used in accordance with the invention are the bromides of sodium, potassium, ammonium, calcium, magnesium, zinc, cobalt, lead antimony and iron. Examples of oxybromides are those of calcium and magnesium. This list is by no means exhaustive and other bromides and oxybromides are applicable. If desired, it is possible to incorporate in the bonding agent together with the oxybromides and/or bromides, as the case may be, a certain proportion of borax, boric acid, or phosphates such as mono- and diammonium phosphate, antimony oxide, sulphamates, ammonium sulphate and others. By doing this the required quantity of oxybromide and/or bromide is reduced without affecting the resulting fire resistance of the bonded cellulosic or lignocellulosic articles.

For determining the kind of oxybromides and/or bromides and relative amount to be incorporated into the bonding agent composition it is possible to consider either the viscosity or the surface tension as the reference fluid state characteristic.

As the bromide and/or oxybromide containing bonding agents are used in accordance with the present invention in the form of aqueous compositions, i.e. emulsions, suspensions or solutions, it is of great advantage that most inorganic bromides are highly water-soluble, the solubility varying between 40 and 120% by weight of the water used. Consequently relatively large quantities of bromides can be incorporated in aqueous bonding agent compositions used in the manufacture of bonded cellulosic articles in accordance with the invention.

Against this the oxybromides are only sparingly water soluble and their incorporation in an aqueous bonding agent composition as a rule increases the viscosity of the latter. Therefore, in accordance with the invention oxybromides will be used as a rule in combination with viscosity-lowering bromides.

When an oxybromide is used in accordance with the invention it may serve at the same time as filler.

In manufacture of bonded cellulosic articles in accordance with the invention, the bomide and oxybromide salts can be added to the bonding agent composition or to any of the ingredients from which the bonding agent is made up in the form of concentrated aqueous solutions, dry or substantially dry powders, as dispersions or in any other form that is convenient. The admixture should be effected in such a way that the oxybromide and/or bromide compounds are thoroughly mixed within the ingredients that form the bonding agent composition or within the bonding agent composition itself, as the case may be.

Many of the bonding agents used in the manufacture of bonded cellulosic articles are waterproof. The incorporation of oxybromide and bromide compounds in these bonding agents in accordance with the invention results in the production of a product that is both waterproof and fireproof and in which the fireproofing oxybromides and/or bromides are protected from being leached out. These structures are thus particularly stable and of long durability.

The bromides and oxybromides incorporated in the bonding agents in accordance with the present invention are, as a rule, chemically inert and do not react chemically with the cellulosic or lignocellulosic material or with any of the ingredients of the bonding agent composition so that the physical properties of the bonded cellulosic article are not adversely affected by the incorporation of the oxybromides and/or bromides into the bonding agent.

Figure 2:
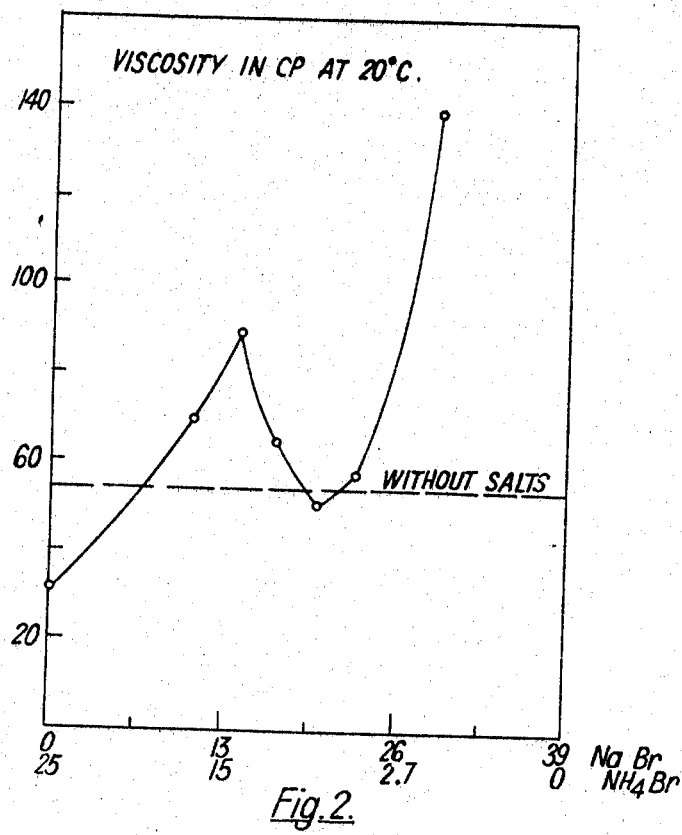

By way of example, it has been found, in accordance with the invention, that ammonium bromide lowers both the surface tension and the viscosity of an aqueous ureaformaldehyde resin composition. Against this it has been found that sodium bromide raises both the surface tension and the viscosity of the same composition. These effects are illustrated in the enclosed drawings in which:

FIG. 1 is a diagrammatic representation of the variation of the surface tension of an aqueous ureaformaldehyde composition upon the addition of varying amounts of ammonium bromide and sodium bromide; and FIG. 2 shows the variation of the viscosity of the same composition upon the addition of varying amounts of sodium bromide and ammonium bromide.

Referring first to FIG. 1, the hyphenated horizontal line shows the normal surface tension of an aqueous urea-formaldehyde composition with a solid content of 49% by weight. The variation of the surface tension upon addition of varying amounts of sodium bromide and ammonium bromide is shown by the drawn out line. As seen, upon the addition of 25% by weight of ammonium bromide the surface tension drops from about 68 dynes/cm. to about 58 dynes/cm. If now the ammonium bromide content is gradually lowered and at the same time sodium bromide is added in such a proportion that the total bromide anion content of the composition remains essentially the same the surface tension rises gradually until at about a content of about 16% by weight of sodium bromide and approximately 12% by weight of ammonium bromide the surface tension reaches the original value. By further lowering the ammonium bromide content and increasing the sodium bromide content the surface tension at first rises somewhat further, reaches a peak which is at approximately 72 dynes/cm. and then approaches asymptotically the normal surface tension line. Thus, where such a composition is to be used for the purposes of the present invention the ammonium bromide content should not exceed approximately 12% by weight and the sodium bromide content should not be less than approximately 16% by weight.

The variations of the viscosity of the aqueous bonding agent composition upon the addition of varying quantities of ammonium bromide and sodium bromide are shown in FIG. 2. Again, the normal viscosity is indicated by the hyphenated line and has a value of approximately 55 cp. The actual viscosity is shown by the drawn-out line and it is seen that there exists one point and one comparatively narrow range around which the viscosity corresponds to the original one. The first of these is at a sodium bromide content of about 6.5% by weight and ammonium bromide content of approximately 20% by weight. The second one corresponds to a sodium bromide content from about 19 to about 22 by weight and an ammonium bromide content from about 6 to about 20% by weight.

When considering FIGS. 1 and 2 in combination it becomes obvious that only the second range of FIG. 2 conicides with the eligible range of FIG. 1 and consequently where an aqueous urea-formaldehyde composition with 49% by weight solid content is to be used as bonding agent for the purpose of the present invention and the couple amonium bromide-sodium bromide serves as fireproofing agent, the range of from 17 to 22% by weight of sodium bromide and 6 to 20% by weight of ammonium bromide will preferably be selected. However, the range of about 6.5% of NaBr at about 22% by weight of $NH_4Br$ can also be used in cases where the viscosity is overriding.

Most viscosity and surface tension measurements are easily carried out. Therefore, it is a simple matter to establish for each combination of bromides or bromide/ oxybromide to be used as fireproofing agents for a desired bonding agent composition, the optimum relative proportions between the individual salts in an analogous manner as has been exemplified with reference to FIGS. 1 and 2.

By adhering to the principles of the present invention as has been defined hereinbefore, the bonding capacity of the bonding agent is not affected by the incorporation of the bromides and oxybromides while at the same time an appreciable degree of fire resistance of the finished bonded cellulosic article is obtained.

In case of a laminate structure composed of a large number of plies it may in accordance with the invention be sufficient to apply the bromide and oxybromide containing bonding agent composition only to the outer plies, for example first and second, in order to obtain a desired degree of flame-proofing of the surface. Likewise, it is possible in accordance with the invention to glue a sheet of paper on the surface of a plywood or any other laminate using as adhesive a bromide or oxybromide containing bonding agent composition while the plywood and laminate itself incorporates an ordinary bonding agent. In this manner the desired flame-proofing of the surface is achieved by using bromide in an amount of the order of only 0.5% of the total weight of the plywood or laminate.

The invention is further illustrated by the following examples without being limited thereto, all parts by weight.

EXAMPLE 1

An adhesive mixture was made up of 30 parts of solid commercial starch and urea-formaldehyde containing adhesive (relative proportion approximately 1:1), 31.5 parts of ammonium bromide, 9.9 parts of sodium bromide and 70 parts of water.

60 grams of this composition were evenly brushed on 1 m.$^2$ sheet of commercial kraft paper weighing 120 grams. A second similar sheet of kraft paper was placed on the first so that the adhesive line was between the sheets. The resulting laminate was pressed and dried for 3 minutes at 70° C. The analysis of a part of the laminate shows that it contained 6.5% of bromine. A piece of the sample 2.75 inches wide and 8.25 inches long was tested according to the Tappi Method for flammability of treated paper and paperboard T 461 mm.-48. The sample did not inflame. When taken out from the Bunsen flame it did not continue to burn and no perceptible after-glowing was observed. A similar laminate composed of two 1 m.$^2$ sheets of kraft paper was prepared using the same adhesive to which no bromides were added. When testing the laminate according to the same T 461 m.-48 it inflamed immediately and burned completely.

EXAMPLE 2

100 kg. of Okumé wood chips measuring 0.2–1 mm.-thickness, 5–17 mm.-length and 0.4–1 mm.-width, and containing 2.5% of moisture were sprayed in a commerical glue sprayer used in the production of chip boards, with 26.2 kg. of a glue composed of 9 kg. of dry commercial urea-formaldehyde adhesive, 6 kg. of ammonium bromide, 2.5 kg. of sodium bromide and 9.4 kg. of water. The sprayed chips were made up into sheets and pressed on a commercial hot press at 130° C. at a pressure of 19 kg./cm.$^2$ for 7 minutes. The chipboard obtained had a specific gravity of 0.65 g./cm.$^2$ and a thickness of 23 mm. Samples of 30 x 30 cm. of this board were tested by the fire-testing apparatus and method according to the French Standard Method, based on the Decree of the Minister of Interior, No. 57–1161 of 17.10.1957 and published in the Journal Official de la République Française of Jan. 16, 1958, pp. 611–618. The samples of the bromide containing boards were classified according to the results of the test as non-inflammable.

Similar particle boards were prepared from 100 kg. of the similar chips sprayed with 18.4 kg. of a glue composed of 9 kg. of commercial urea-formaldehyde and 9.4 kg. of water and pressed under the same conditions. Samples of the board tested by the same French Standard Method were classified as easily inflammable.

EXAMPLE 3

Veneers of Okumé wood were coated with a phenolic resin glue containing 17% by weight of bromide ion. The bromide ion was incorporated in the glue by dissolving in it 8 parts of sodium bromide, 7 parts of ammonium bromide and suspending therein 8.25 parts of a powder of magnesium oxybromide, all parts being grams per 100 mls. of glue. The veneers were 1 mm. thick and 5 plies were superposed. The second, third and fourth plies were coated on both sides while the first and fifth were coated on one side only. The veneers were pressed in a plywood press at 140° C. and 40 kgs./cm.$^2$ pressure, in a manner conventional for the manufacture of plywood.

The plywood panel obtained had a highly improved resistance to flame spread as compared to a panel which was produced without addition of bromide and oxybromide to the glue.

What I claim is:

1. In the production of a bonded cellulosic article employing an aqueous bonding agent composition, the method of imparting a degree of fire ressitance to the finished article by incorporating in the fluid bonding agent composition at least two substances, one of which consists of a metal bromide, and the other of which is selected from the group consisting of metal bromides differing from the metal of said first mentioned metal bromides and metal oxybromides, one of which substances lowers at least one of the viscosity, the surface tension or the viscosity and the surface tension of the fluid bonding agent composition and the other of which substances raises the viscosity, the surface tension or the viscosity and the surface tension of the fluid bonding agent composition, said substances being incorporated in an amount of from 0.4% to 12% by weight of cellulose.

2. A method according to claim 1, wherein the relative proportions between said substances are so selected that the viscosity, the surface tension or the viscosity and the surface tension retain substantially the value the aqueous bonding agent had before the addition of said substances.

3. A method according to claim 1, wherein the relative proportions between said substances are so selected that the viscosity, the surface tension or the viscosity and the surface tension assume a value greater than the value the aqueous bonding agent had before the addition of said substances.

4. A method according to claim 1, wherein only one of the viscosity and the surface tension is employed to control the relative proportions of said substances.

5. A method according to claim 1, wherein both the viscosity and the surface tension are employed to control the relative proportions of said substances.

6. A method according to claim 1, wherein the relative proportions between said substances are so selected that the viscosity, the surface tension or the viscosity and the surface tension assume a value less than the value the aqueous bonding agent had before the addition of said substances.

7. A method according to claim 1, wherein one of the substances is a metal bromide and the other is a metal oxybromide.

References Cited

UNITED STATES PATENTS

| | | | |
|---|---|---|---|
| 2,912,394 | 11/1959 | Stilbert et al. | 117—138 X |
| 3,092,537 | 6/1963 | Brandts | 162—159 |
| 3,132,045 | 5/1964 | Hill | 117—138 |
| 3,150,919 | 9/1964 | Lewin | 162—159 X |
| 3,248,257 | 4/1966 | Cadotte et al. | 162—159 X |

S. LEON BASHORE, Primary Examiner

U.S. Cl. X.R.

117—138; 161—403; 162—165, 166, 175, 181, 183